US009180612B2

(12) United States Patent
Kerbiguet et al.

(10) Patent No.: US 9,180,612 B2
(45) Date of Patent: Nov. 10, 2015

(54) DEVICE FOR ASSEMBLING TWO PARTS MADE FROM THERMOPLASTIC MATERIALS BY MEANS OF LASER-TRANSPARENT WELDING, ASSEMBLY METHOD AND ASSOCIATED CLAMPING FITTING

(75) Inventors: Jean Gilles Kerbiguet, Le Chesnay (FR); Herve Guermeur, Oinville (FR); Lucio Tirado, Le Celle Saint Cloud (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 197 days.

(21) Appl. No.: 13/696,698

(22) PCT Filed: May 6, 2011

(86) PCT No.: PCT/FR2011/051032
§ 371 (c)(1),
(2), (4) Date: Dec. 26, 2012

(87) PCT Pub. No.: WO2011/138568
PCT Pub. Date: Nov. 10, 2011

(65) Prior Publication Data
US 2013/0105075 A1    May 2, 2013

(30) Foreign Application Priority Data

May 7, 2010    (FR) ..................................... 10 53585

(51) Int. Cl.
*B29C 43/58*    (2006.01)
*B29C 65/16*    (2006.01)
(Continued)

(52) U.S. Cl.
CPC ............. *B29C 43/58* (2013.01); *B29C 65/1635* (2013.01); *B29C 65/1654* (2013.01);
(Continued)

(58) Field of Classification Search
CPC ............ B29C 65/1635; B29C 65/7844; B29C 65/1654; B29C 66/92613; B29C 66/112; B29C 66/131; B29C 66/349; B29C 66/80; B29C 66/8161; B29C 66/81815; B29C 66/9241; B29C 66/92431; B29C 66/836; B29C 66/8145; B29C 66/81463
USPC ................................................ 156/379.6, 358
See application file for complete search history.

(56) References Cited

U.S. PATENT DOCUMENTS 6,444,946 B1 *   9/2002   Korte ......................... 219/121.6
2005/0167042 A1  8/2005   Hofmann et al.
(Continued)

FOREIGN PATENT DOCUMENTS

DE    199 24 469    11/2000
DE    100 04 538    8/2001
(Continued)

OTHER PUBLICATIONS

Baylis, B., et al., "Pyrometer Measurements During Laser Welding of Thermoplastic Elastomers to Polypropylene and of Nylon to Itself," ANTEC, pp. 1111 to 1115, (Jan. 1, 2003).
(Continued)

*Primary Examiner* — Daniel McNally
(74) *Attorney, Agent, or Firm* — Oblon, McClelland, Maier & Neustadt, L.L.P.

(57) ABSTRACT

A device for assembling a first upper transparent part to a second lower absorbent part, the parts being positioned on a support. The device includes a mechanism projecting a laser beam onto the upper part, a first clamp geometrically referencing the assembly formed by the two parts and positioned on the support, a second clamp exerting a pre-determined stress on the assembly of parts, and a management system associated with the second clamp, adjusting the stress exerted at a pre-determined welding interface. An assembly method is intended for laser-transparent welding of two parts assembled using one such assembly device. The clamping fitting is configured to apply the stress exerted at the welding interface.

19 Claims, 6 Drawing Sheets

(51) Int. Cl.
*B29C 65/78* (2006.01)
*B29C 65/00* (2006.01)
*B29K 23/00* (2006.01)
*B29K 77/00* (2006.01)
*B29K 101/12* (2006.01)
*B29K 105/06* (2006.01)
*B29K 309/08* (2006.01)
*B29L 31/30* (2006.01)
*B29L 31/00* (2006.01)

(52) U.S. Cl.
CPC .......... *B29C65/7844* (2013.01); *B29C 66/112* (2013.01); *B29C 66/131* (2013.01); *B29C 66/349* (2013.01); *B29C 66/80* (2013.01); *B29C 66/8145* (2013.01); *B29C 66/8161* (2013.01); *B29C 66/81463* (2013.01); *B29C 66/81815* (2013.01); *B29C 66/836* (2013.01); *B29C 66/9241* (2013.01); *B29C 66/92431* (2013.01); *B29C 66/92613* (2013.01); *B29C 66/3494* (2013.01); *B29C 66/54* (2013.01); *B29C 66/8167* (2013.01); *B29C 66/863* (2013.01); *B29K 2023/12* (2013.01); *B29K 2077/00* (2013.01); *B29K 2101/12* (2013.01); *B29K 2105/06* (2013.01); *B29K 2309/08* (2013.01); *B29L 2031/30* (2013.01); *B29L 2031/724* (2013.01)

(56) References Cited

U.S. PATENT DOCUMENTS

| | | | |
|---|---|---|---|
| 2006/0283544 A1* | 12/2006 | Mori et al. | 156/272.8 |
| 2007/0084552 A1* | 4/2007 | Watanabe et al. | 156/272.8 |
| 2007/0131401 A1* | 6/2007 | Daly et al. | 165/158 |
| 2008/0302484 A1 | 12/2008 | Watanabe et al. | |
| 2009/0152248 A1* | 6/2009 | Schmid et al. | 219/121.64 |
| 2010/0140232 A1 | 6/2010 | Brunnecker et al. | |

FOREIGN PATENT DOCUMENTS

| | | |
|---|---|---|
| DE | 10004538 A1 * | 8/2001 |
| DE | 10 2007 042 739 | 10/2008 |
| EP | 1 652 615 | 5/2006 |
| JP | 2007 111927 | 5/2007 |
| JP | 2010 105376 | 5/2010 |

OTHER PUBLICATIONS

International Search Repot Issued Sep. 12, 2011 in PCT/FR11/051032 Filed May 6, 2011.

* cited by examiner

DEVICE FOR ASSEMBLING TWO PARTS MADE FROM THERMOPLASTIC MATERIALS BY MEANS OF LASER-TRANSPARENT WELDING, ASSEMBLY METHOD AND ASSOCIATED CLAMPING FITTING

TECHNICAL FIELD OF THE INVENTION

The invention relates to a device for assembling two parts by laser transmission welding, a first transparent top part being positioned on a second absorbing bottom part, the assembly of the two parts being positioned on a support for the laser welding, the assembly device comprising a means for projecting a laser beam onto the top surface of said top part and assembly means capable of keeping the assembly of the two parts assembled together on the support.

The invention also relates to a method for assembling two parts by laser transmission welding, a first transparent top part being positioned on a second absorbing bottom part, the two parts being positioned on a support for the laser welding and assembled together on the support by means of such an assembly device.

The invention also relates to a clamping end-piece associated with such an assembly device intended for the laser transmission welding of two parts, a first transparent top part being positioned on a second absorbing bottom part, the assembly of the two parts being positioned on a support for the laser welding.

PRIOR ART

Recent years have seen the emergence of a significant demand to reduce the weight and the cost of the parts, notably in the field of components for the motor industry. More particularly, for the production of a motor vehicle, many sheet steel parts are needed, said sheet steel parts having more or less complex shapes, for which it is necessary to provide complex assembly methods. Thus, it has been proposed to use parts made of thermoplastic materials, in order to reduce both the weight of the part, and also its cost. In parallel, improvements to the existing assembly methods have been proposed, in order to adapt them to the assembly of parts made of thermoplastic materials.

Such is the case notably with the documents DE 199 24 469, US 2005/167042 and EP 1 652 615, which describe installations comprising devices for assembling parts made of thermoplastic materials. However, such installations are very intensive in terms of machinery, complex to use and implementing assembly methods with very little flexibility.

Another type of laser assembly method is also described in the document EP 1 777 057. The latter notably describes a first top part that is transparent to a laser beam, projected onto the top surface of the part, which is positioned on a second bottom part, which is absorbing, or opaque to the particular wavelength of the projected laser beam. The two parts are assembled together and positioned on a support for the laser welding. A controlled pressurization of the two parts is also provided all along a welding interface while the laser ray travels along this interface. The temperature of the absorbing bottom part will then be raised to melting temperature and will melt by diffusion the transparent material of the top part, creating a permanent weld in the cooling phase.

Such is also the case with the assembly method described in the document EP 1 440 784, which notably describes a direct pressurization of the top part onto the bottom part via a pressure ball that is transparent to the laser ray and that rolls along the welding interface.

However, with such assembly methods, one problem that is encountered lies in the nature of the parts to be assembled, one often being an appearance part, for example of the motor vehicle door internal trim type, that must absolutely not be visually degraded. More particularly, the loading and the stacking of the parts on the support of the assembly device involve first placing the absorbing, or flexible, part, and then the transparent, or rigid, part. Now, with a conventional assembly device, as described notably in the document EP 1 440 784, the pressurization of the parts is then applied on the side of the rigid part, namely the appearance part in the case described above. This results notably in a major risk of marking the part, generating defects in terms of perceived quality.

Moreover, problems in terms of reliability and ease of mounting, clamping and fixing of the assembled parts also emerge. Similarly, the controlled pressurization described in the document EP 1 777 057 is not optimal, because it requires many parts, which adds to the complexity and considerably increases the price of such an assembly device. Moreover, the pressurization by a ball described in the document EP 1 440 784 does not allow great flexibility in the choice of the dimensions and materials of the parts to be assembled.

OBJECT OF THE INVENTION

The aim of the invention is to remedy all of the abovementioned drawbacks and its object is the production of a device for assembling two parts, more particularly two parts made of thermoplastic materials, which is simple, effective and rapid, which guarantees an optimal weld quality while allowing great flexibility according to the parts to be assembled.

The object of the invention is characterized, more particularly, by the fact that said assembly means comprise at least:
  first clamping means, intended to ensure the geometrical referencing of the assembly of the two parts positioned on said support,
  second clamping means, intended to exert a predetermined force against the assembly of the two parts positioned on said support,
  and a management system, associated with said second clamping means and intended to adjust said force exerted by said second clamping means at a predetermined welding interface of the two parts.

Such an assembly device, with specific clamping means for the referencing of the parts and for the application of a force, makes it possible notably to optimize the assembly of the two parts together and to ensure a perfect joining of the two parts at the welding interface.

Other advantages and features of the invention can be considered in isolation or in combination.

Said first clamping means may comprise a plurality of movable members, capable of being actuated independently of one another at said welding interface, manually or automatically.

The laser beam being projected on an axis substantially at right angles to said welding interface, said first clamping means may be actuated in a direction parallel to said axis of projection of the laser beam.

Such clamping means that are totally independent of one another along the welding interface notably allow for an optimal geometrical referencing of the two parts, thus ensuring a good joining of the parts at the welding interface. Such clamping means that can be adjusted independently of one another also allow for adjustment in three dimensions along the welding interface, thus offering a distribution of the forces and a stress application that are totally optimized according to the conformation and the type of the parts to be assembled.

Said second clamping means may be linked to a mechanical fixing interface, so as to position said second clamping means facing an end of said means for projecting the laser beam.

Said second clamping means may comprise a clamping end-piece provided with at least one application finger, for example four substantially parallel application fingers, arranged so as to be positioned substantially at the four corners of a square and that may comprise a substantially rounded end-piece.

Such clamping means mounted on a fixing plate attached to the means for projecting the laser beam notably make it possible to lighten the assembly device by eliminating additional clamping means and by incorporating the function of application of a force in the clamping end-piece which travels along the welding interface.

Said second clamping means may comprise associated cooling means.

Such cooling means notably make it possible to cool the clamping end-piece, in contact with the top surface of the top part during the associated assembly method.

In a first variant, said force management system may comprise adjustment means, associated with said means for projecting the laser beam, so as to keep said predetermined force constant at the welding interface and maintain a constant focal distance between said welding interface and said means for projecting the laser beam.

In a second variant, said force management system may comprise servo-control means, associated with said means for projecting the laser beam, so as to adjust said predetermined force continuously at the welding interface and maintain a constant focal distance between said welding interface and said means for projecting the laser beam.

Such force management systems notably make it possible to set the necessary and sufficient force at the welding interface throughout the assembly method, in order to ensure an optimal weld quality.

The assembly device may comprise an air input means, intended to project an air stream onto the top surface of said top part simultaneously with the laser beam.

Said means for projecting the laser beam being provided with a projection cone, said air input means may be linked to said projection cone, which acts as a cone for channeling the air stream, so as to obtain a controlled air stream on the top surface of said top part.

Such a controlled air input means makes it possible notably to avoid a carbonization phenomenon (as described below) on the surface of the assembled parts. Such an air input means also makes it possible to advantageously maintain a temperature that is not too high on the clamping end-piece placed facing the means for projecting the laser beam during the associated assembly method.

Another object of the invention is the production of a method of assembly by laser transmission welding which makes it possible to simply, rapidly and effectively weld two parts made of thermoplastic materials, avoiding all the problems and drawbacks cited above.

This object of the invention is characterized, more particularly, by the fact that the method comprises at least:
 a step of geometrical referencing of the assembly of the two parts positioned on said support by first clamping means,
 a step of conformation of the assembly of the two parts positioned on the support by second clamping means, associated with a predetermined force management system, capable of controlling said force exerted by said second clamping means against the assembly of the two parts positioned on said support, and
 a step of laser transmission welding via a means for projecting a laser beam at a predetermined welding interface of the two parts.

Such a laser welding method therefore makes it possible to simply and rapidly assemble two parts made of thermoplastic materials.

Other advantages and features of the invention can be considered in isolation or in combination.

Notably, said step of conformation of the assembly of the two parts can be carried out simultaneously with the laser welding step, at the welding interface, by said second clamping means in contact with the top surface of the top part.

Such dynamic securing of the assembly of the two parts on the support makes it possible to ensure a perfect joining at the welding interface along the entire travel of the laser beam.

A constant predetermined force can be applied by said second clamping means against the top surface of the top part, during said laser welding step, or a variable predetermined force can be applied against the top surface of the top part, during said laser welding step, via servo-control means of said force management system associated with said second clamping means.

Such a force management system therefore makes it possible, depending on the case, to apply a previously fixed constant force before the start of the assembly method or to adjust the force dynamically during the laser welding step, so as to maintain a constant focal distance between the means for projecting the laser beam and the welding interface.

The assembly method may comprise, simultaneously with said laser welding step, a step of projecting a controlled air stream onto the top surface of said top part.

Such an air projection step simultaneously with the laser welding step makes it possible notably, on the one hand, not to degrade the surface of the assembled parts by preventing a carbonization phenomenon on the surface of the parts and, on the other hand, to cool the clamping end-piece mounted bearing against the top surface of the top part.

Yet another object of the invention is the production of a clamping end-piece associated with the assembly device for the laser transmission welding, which makes it possible to apply a predetermined force to the parts to be assembled simply and effectively, avoiding all the problems and drawbacks cited above, notably marking of the parts.

This object of the invention is characterized more particularly in that the clamping end-piece comprises at least one application finger intended to exert a predetermined force against the assembly of the two parts positioned on said support.

Such a clamping end-piece thus allows for a direct application onto the top part of a predetermined force, continuously for the entire duration of the laser welding step of the associated assembly method.

Other advantages and features of the invention can be considered in isolation or in combination.

Notably, the clamping end-piece may comprise four substantially parallel application fingers, arranged so as to be positioned substantially at the four corners of a square.

Each application finger may comprise a substantially rounded section and a substantially domed end-piece.

Such features of the clamping end-piece notably allow for an application of the optimal force, while avoiding the marking of the top part.

The clamping end-piece comprising a number of application fingers, the clamping end-piece may comprise at least one solid wall linking the application fingers, so as to form interstices between the application fingers.

Such a wall thus makes it possible to make the clamping end-piece rigid and the interstices formed notably make it possible to improve the cooling of the clamping end-piece during the laser welding step of the associated assembly method.

BRIEF DESCRIPTION OF THE DRAWINGS

Other advantages and features will emerge more clearly from the following description of particular embodiments of the invention, given as nonlimiting examples and represented in the appended drawings, in which:

FIGS. 5a and 5b represent, respectively a perspective view of a particular embodiment of a clamping end-piece according to the invention, associated with the assembly device according to FIGS. 1 to 4, and a view of the detail B of the end of the clamping end-piece according to FIG. 5a.

DESCRIPTION OF PARTICULAR EMBODIMENTS

Referring to the figures, the assembly device 10 according to the invention is intended for the assembly of two parts made of thermoplastic materials by laser transmission welding. The assembly device 10 according to the invention takes into account more particularly the constraints which are linked to the material of the parts to be assembled and that are linked to the associated laser welding method, namely the materials and their difference in rigidity, the fact that one of the two parts is, for example, an appearance part and that the joining is necessarily perfect at the welding interface of the two parts. More particularly, the assembly device 10 according to the invention is, for example, intended to assemble a motor vehicle trunk lid.

In the following description, the expressions such as "rear" and "front", "left" and "right", "top" and "bottom", and the "longitudinal", "transversal" and "vertical" orientations will be used in a nonlimiting manner with reference to the X, Y, Z reference trihedron, represented in the figures and to the definitions given in the description.

Figure 1:
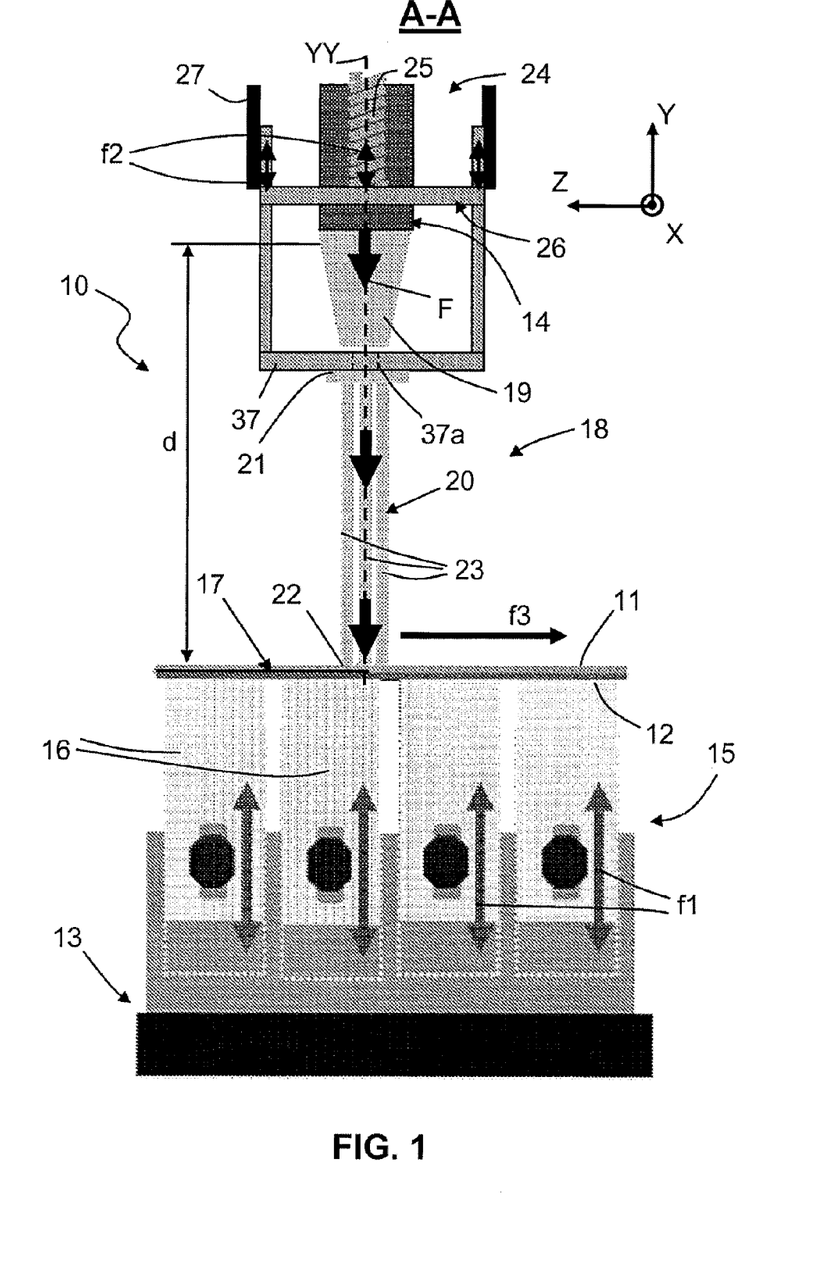
FIG. 1 schematically represents a partial front view, according to the cross section A-A of FIG. 2, of a particular embodiment of an assembly device according to the invention.
Figure 2:
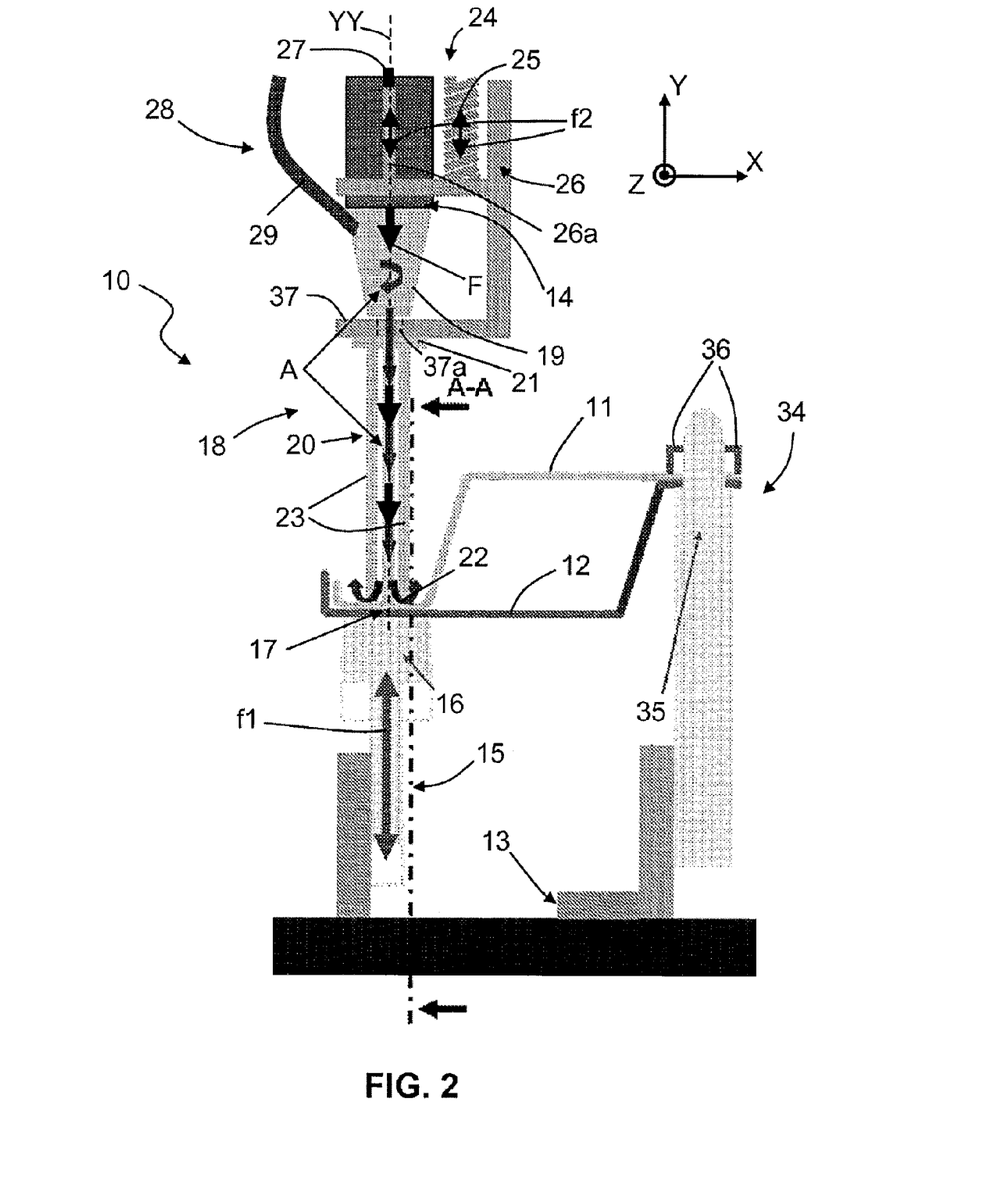
FIG. 2 schematically represents a partial side view of the assembly device according to FIG. 1.

In the first embodiment represented in FIGS. 1 and 2, the assembly device 10 according to the invention is intended for the assembly of two parts 11, 12 made of thermoplastic materials. More particularly, the two parts 11, 12 are positioned on a support 13, adjusted so as to stably receive the two parts 11, 12 in accordance with the desired geometry for the parts 11, 12. The assembly device 10 comprises a means 14 for projecting a laser beam, intended to project a laser beam F onto the assembly of the two parts 11, 12. More particularly, the top part 11, transparent to the laser beam F, is, preferably, a rigid part, and the absorbing bottom part 12 is, preferably, a flexible part. The interface between the bottom part 12 and the top part 11 is intended to be heated by the laser beam F until the absorbing bottom part 12 melts, in order to melt by diffusion the transparent material of the top part 11, thus creating a permanent weld during the cooling phase.

Moreover, the assembly device 10 comprises first bottom clamping means 15, that is to say capable of bearing against the bottom surface of the bottom part 12, comprising, for example, a plurality of movable members 16, distributed all along the perimeter of the parts 11, 12 to be assembled, more specifically all along a predetermined welding interface 17, or welding track, where the welding of the two parts 11, 12 will be performed.

Figure 4:
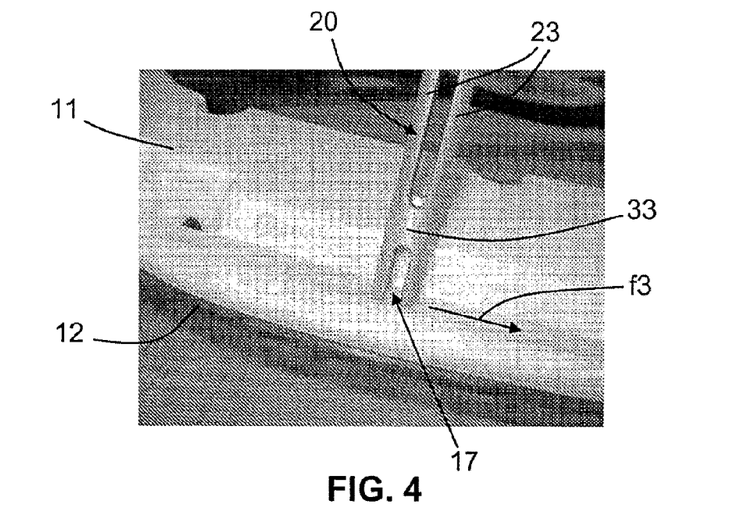
FIG. 4 represents a partial perspective view of a particular exemplary application of the assembly device according to FIGS. 1 to 3, for two parts made of thermoplastic materials of the motor vehicle trunk lid type.

"Welding interface" 17, or "welding track", should be understood here to mean the contact interface between the two parts 11, 12, namely all of the areas corresponding to the joined portions of the two parts 11, 12 intended to be welded. That is to say, in the case of complex parts of the motor vehicle door or trunk panel type, this corresponds substantially to the edges of the parts 11, 12, as represented in FIGS. 2 and 4, but equally to the portions of the two parts 11, that are in contact, situated more toward the interior or the center of the parts 11, 12. Similarly, the welding interface 17 preferably comprises no overthickness of the surface marking or defect type and no underthickness, of the type resulting from the imprints of mold ejectors. As a general rule, the welding interface 17 between the parts 11, 12, namely all of the areas to be welded corresponding to the run of the laser beam, must be as smooth as possible, with no surface defect in the form of either hollows or bumps.

The main function of such bottom clamping means 15 is to ensure the geometrical referencing of the assembly of the two parts 11, 12 positioned on the support 13 of the assembly device 10 according to the invention. The aim of such geometrical referencing is notably to place the parts 11, 12 in a configuration such that they mold perfectly to the shape of the reference part, namely the rigid part, in order to guarantee the joining and the desired geometry of the two parts 11, 12 (FIGS. 1 to 3 and 7).

As an example, as represented in FIGS. 1 and 2, the movable members 16, for example of screw, pushbutton, finger, plate, etc. type, are mounted so as to move independently of one another according to the arrow f1, parallel to the vertical axis Y of FIGS. 1 and 2. As a general rule, each movable member 16 is mounted to move independently of the others and at right angles to the bottom surface of the bottom part 12, more particularly at the welding interface 17 of the two parts 11, 12 and therefore parallel to an axis YY of projection of the laser beam F.

Moreover, the movable members 16 can be actuated manually, the position of each movable member 16 being set before starting the laser welding step of the associated assembly method, or can be actuated automatically by any appropriate type of actuation means (of electrical, pneumatic, etc. type) associated with the assembly device 10 according to the invention.

Figure 7:
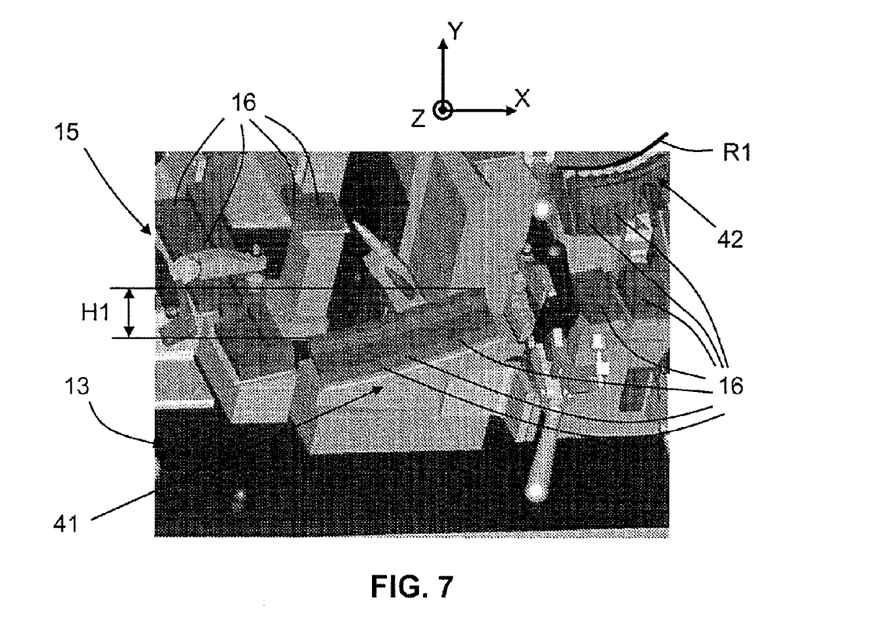
FIG. 7 schematically represents a partial perspective view of the clamping means of the assembly device according to FIGS. 1 to 4.

Moreover, as represented more particularly in FIG. 7, the movable members 16 of the clamping means 15 are arranged on the support 13 so as to be able to be oriented according to the three dimensions represented schematically by the X, Y, Z reference trihedron. As indicated previously, the welding interface 17 of the parts 11, 12 intended to be assembled comprises not only the edge of the parts 11, 12, but also portions of parts situated more toward the center. Notably, as represented in FIGS. 1, 2 and 4, the parts 11, 12 to be assembled are not uniform planar plates but preformed parts, the welding interface 17 of which comprises portions at different heights according to the X, Y, Z trihedron.

In FIG. 7, the support 13 is thus equipped with a multitude of movable members 16 distributed all along the welding interface 17 and whose position is adjusted according to the shape of the parts 11, 12 to be assembled. As an example, the clamping means 15 comprise, for example, a first strip 41 of movable members 16, associated with the edge of the parts 11, and juxtaposed with one another but staggered in height, so as to form a slope of height H1.

Again by way of example, the clamping means 15 also comprise a second strip 42 formed by a plurality of movable members 16 arranged so as to form a circular arc with a radius of curvature R1 corresponding to a particular conformation of the parts 11, 12 to be assembled.

As a general rule, the clamping means 15 thus have a multitude of movable members 16 arranged in a manner completely independent of one another and that can be moved on all three axes of the X, Y and Z trihedron so as to be adapted perfectly to the shape of the parts 11, 12 to be assembled. Such clamping means thus allow a great degree of flexibility depending on the parts to be assembled, only the adjusting of the movable members being necessary in case of a change of the parts 11, 12 to be assembled or in case of adjustment of the forces to be applied.

In FIGS. 1 and 2, the assembly device 10 according to the invention also comprises second top clamping means 18, that is to say capable of bearing against the top surface of the top part 11. The main function of the top clamping means 18 is to exert a predetermined force against the assembly of the two parts 11, 12 assembled on the support 13, all along the welding interface 17, as described above. As a general rule, the predetermined force exerted by the second clamping means 18 should be calculated so as to be necessary and sufficient to the good joining of the two parts 11, 12, throughout the laser welding step of the associated assembly method.

As an example, the end of the means 14 for projecting the laser beam F preferably has the form of a cone 19 for projecting the laser beam F and the second clamping means 18 comprise a clamping end-piece 20 (FIGS. 4, 5a and 5b) solidly linked to a fixing plate 37. More particularly, the clamping end-piece 20 is attached to the fixing plate 37, so as to place the clamping end-piece 20 substantially facing the cone 19 for projecting the laser beam F, with a slight gap of the order of a few tenths of millimeters (the gap being deliberately emphasized in FIGS. 1 and 2 for reasons of clarity). The fixing plate 37 then preferably comprises an orifice 37a (represented by dotted lines in FIGS. 1 and 2), the dimensions of which are suitable for allowing the laser beam F to pass through the fixing plate 37.

In this configuration, the fixing plate 37 then acts as a mechanical fixing interface between the projection cone 19 and the clamping end-piece 20, thus making it possible to take up the forces resulting from the application of the predetermined force on the top surface of the top part 11 by the clamping end-piece 20. This force take-up by the fixing plate 37 makes it possible notably not to stress the means 14 for projecting the laser beam and to avoid any breakage or replacement of this part, which would prove much more costly than the replacement of just the clamping end-piece 20.

Figure 5A:
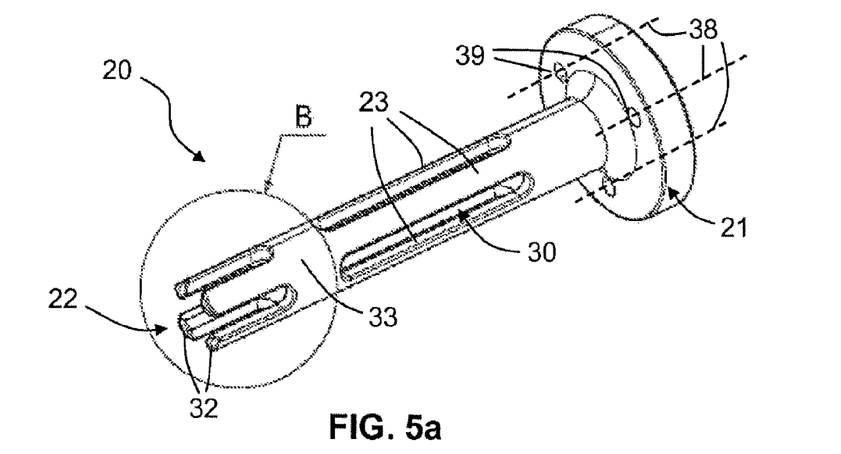
Figure 5B:
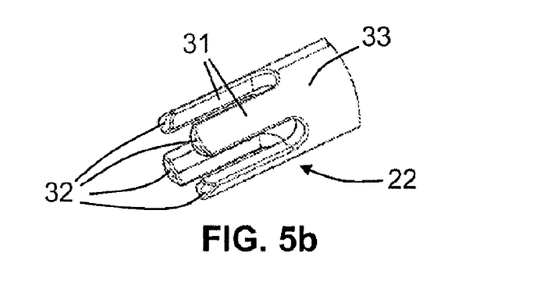

In the particular embodiment represented in FIGS. 1 and 2, the clamping end-piece 20 according to the invention is mounted on the fixing plate 37 and linked, at a first end 21, to the fixing plate 37 and intended to bear on the top surface of the top part 11, at a second end 22, via at least one application finger 23, in contact with the top surface of the top part 11 (FIG. 1). As represented in FIGS. 4, 5a and 5b, the particular embodiment of the clamping end-piece 20 according to the invention is preferably provided with four application fingers 23 (only three of which are schematically represented in FIGS. 1 and 2 for reasons of clarity). The application fingers 23 of the clamping end-piece 20 are parallel with one another and arranged relative to one another, so as to be positioned substantially at the four corners of a square, that is to say so as to apply said predetermined force onto the top surface of the top part 11 in four precise geometrical areas distributed in a square.

Moreover, the clamping end-piece 20 is fixed to the fixing plate 37, for example by means of three screws, schematically represented by their reference axes 38 in FIG. 5a, intended to be inserted into corresponding holes 39 produced in the first end 21 of the clamping end-piece 20 (FIG. 5a).

Similarly, the fixing plate 37 is attached, for example, to a frame 26, also serving as mechanical interface, itself attached to the means 14 for projecting the laser beam F. The assembly composed of the frame 26, the means 14 for projecting the laser beam, the fixing plate 37 and the clamping end-piece 20 is then mounted to move relative to an element or member 27 acting as mechanical interface for fixing the assembly onto the head of a welding robot of conventional type (not represented in the figures for reasons of clarity).

Moreover, the assembly device 10 advantageously comprises a force management system 24, associated with the means 14 for projecting the laser beam F and more particularly with the clamping end-piece 20, intended to monitor and control the predetermined force exerted by the application fingers 23 of the clamping end-piece 20 on the top surface of the top part 11, and therefore at the welding interface 17 of the two parts 11, 12. The aim of such a force management system 24 is to keep the predetermined force constant, at the welding interface 17, and to keep the focal distance d constant between the welding interface 17 and the means 14 for projecting the laser beam F (FIG. 1). In this way, the means 14 for projecting the laser beam F is positioned continuously at the same focal distance d from the welding interface 17, and throughout the laser welding step of the associated assembly method.

In the particular example represented in FIGS. 1 and 2, the force management system 24 comprises, for example, a spring 25, formed parallel to the vertical axis of the means 14 for projecting the laser beam F, and therefore of cone 19 for projecting the laser beam F (and therefore of the axis YY of projection of the laser beam F), and linked to the frame 26, which slides according to the arrows f2 relative to the mechanical interface 27.

As represented more particularly in FIG. 2, illustrating the assembly device of FIG. 1 according to a side view, the spring 25 of the management system 24 is, for example, staggered relative to the axis of projection YY of the laser beam F, on the side of the means 14 for projecting the laser beam F. The frame 26 comprises, for example, a branch parallel to the fixing plate 37, on which a rod 26a is mounted in the axis of the means 14 for projecting the laser beam F, the frame 26 being mounted to slide according to the arrows f2 relative to the fixed mechanical interface 27 of the associated laser welding robot.

Such a force management system 24 is intended, on the one hand, to maintain a constant focal distance d between the means 14 for projecting the laser beam F and the welding interface 17 and, on the other hand, to fix previously, that is to say at the start of the associated laser welding method, the value of the force, notably using the spring 25, and to keep it constant throughout the laser welding step while traveling along the welding interface 17. The result of this is thus an optimal weld quality at the welding interface 17.

Moreover, as represented more particularly in FIG. 2, the assembly device 10 according to the invention advantageously comprises an air projection means 28 (represented only in FIG. 2 for reasons of clarity), associated with the means 14 for projecting the laser beam F and intended to project an air stream A simultaneously with the laser beam F. The main function of such an air input, projected in parallel to the laser beam F and along the same reference axis YY (FIG. 2), is to prevent a carbonization phenomenon which can occur on the top surface of the top part 11, only in the case of certain materials and depending on their percentage of transparency (transparency coefficient or transparency rate).

In practice, a carbonization phenomenon can occur on the surface of the welded parts, in case of a bad weld, namely when the top part 11 has overheated and carbonizes, rendering the top part 11 absorbent. In this case, there is no welding at the welding interface 17, because the top part 11 is no longer transparent. The air stream A, the projection power of which thus depends on the more or less transparent characteristics of the top part 11, thus makes it possible to completely prevent this carbonization phenomenon, in order to ensure an optimal weld quality.

As an example, as represented more particularly in FIG. 2, the projection and input means 28 for the air stream A comprises an air feed pipe 29 linked to an air source (not represented) and to the cone 19 for projecting the laser beam F. The cone 19 for projecting the laser beam F then serves as a cone for channeling the air stream A, in order, notably, during the associated laser welding method, to obtain an airstream A that is controlled and calculated to avoid the carbonization phenomenon on the surface of the parts 11, 12, as described above.

Moreover, with the clamping end-piece 20 being positioned facing the cone 19 for projecting the laser beam F, and therefore for channeling the air stream, the air stream projection means 28 advantageously makes it possible to cool to, or at the very least maintain, an acceptable temperature at the clamping end-piece 20. In practice, during the projection of the laser beam F, during the associated assembly method, the laser beam F and the air stream A are projected simultaneously between the application fingers 23 of the clamping end-piece 20 (FIGS. 4, 5a and 5b).

Figure 3:
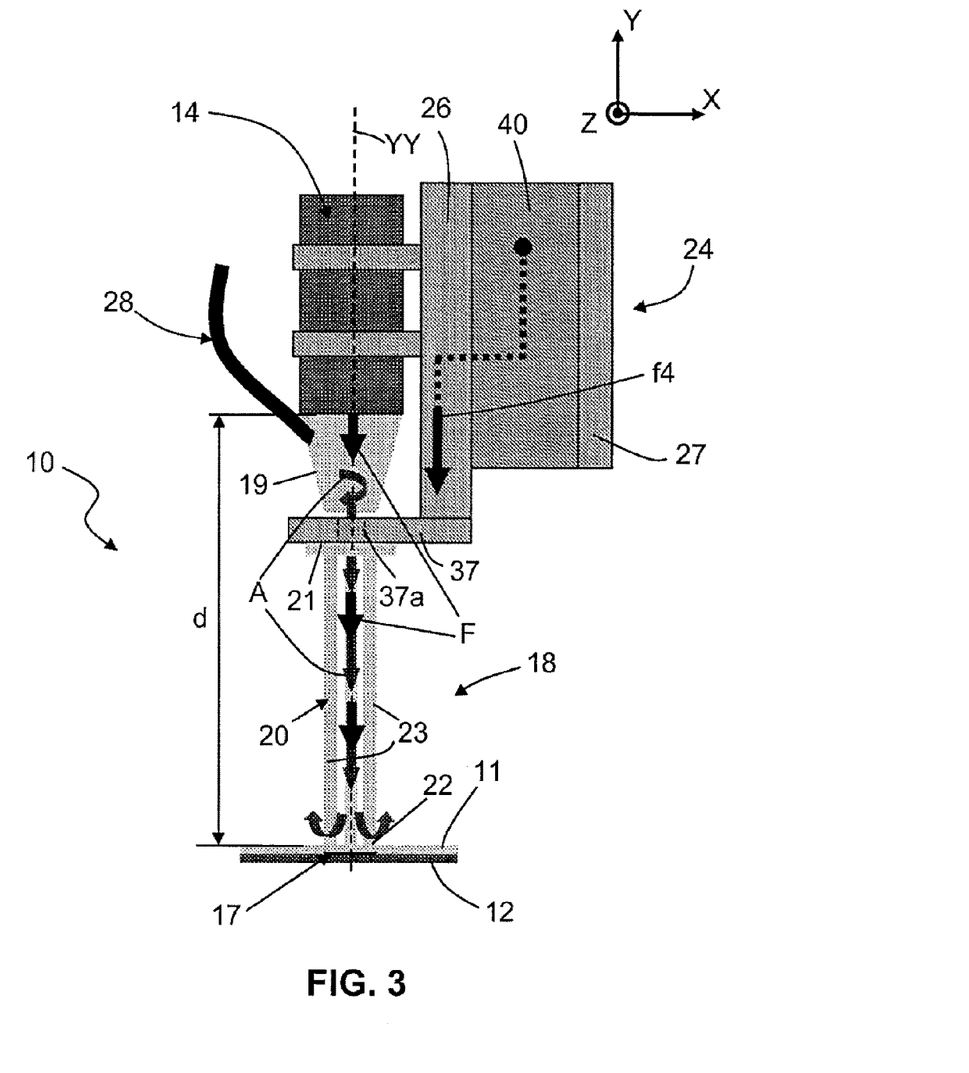
FIG. 3 schematically represents a partial side view of a variant embodiment of an assembly device according to the invention, represented without the support.

In the variant embodiment represented in FIG. 3, the assembly device 10 according to the invention is distinguished from the assembly device represented in FIGS. 1 and 2 by the system 24 for managing the force applied by the clamping end-piece 20 according to the invention onto the top surface of the top part 11. In FIG. 3, the force management system 24 comprises servo-control means 40 making it possible to manage and distribute the force dynamically, that is to say capable of being modified and set throughout the travel of the welding interface 17 during the laser welding step of the associated assembly method.

In FIG. 3, the servo-control means of the management system 24 comprise, for example, a cylinder 40 linked, on the one hand, to the frame 26, and therefore to the fixing plate 37 and to the means 14 for projecting the laser beam F, and, on the other hand, to the fixing interface 27 of the associated welding robot (not represented for reasons of clarity). The servo-controlled cylinder 40 thus makes it possible for the assembly consisting of the means 14 for projecting the laser beam F, the frame 26, the fixing plate 37 and the clamping end-piece 20 to be moved according to the arrow f4 relative to the fixing interface 27 during the welding step, so as to adjust the force applied continuously.

Such servo-control means 40 therefore make it possible to dynamically maintain, throughout the laser welding step of the associated assembly method, said predetermined force at the welding interface 17 of the assembled parts 11, 12, while ensuring that the focal distance d is kept constant.

Moreover, in the variant embodiment represented in FIG. 3, the assembly device 10 also comprises the means 28 for projecting the air stream A, simultaneously with the laser beam F, substantially at the center of the application fingers 23 of the clamping end-piece 20, so as to prevent the carbonization phenomenon on the top surface of the top part 11.

Whatever the embodiment of the assembly device 10, as represented in FIGS. 1 to 4, the two parts 11, 12 to be assembled are made of thermoplastic materials, for example of polypropylene. As a general rule, the parts 11, 12 to be assembled can be produced using any thermoplastic material, for example polyamide, as long as the chosen material exhibits optimal characteristics in terms of solidity, cost, recycling and good aptitude to laser welding, namely transparency, etc. More particularly, the transparent top part 11 can be a part made of glass-fiber-charged polymer materials.

As a general rule, the top part 11 can be rigid or flexible, made of a material more or less charged with glass fibers, as long as it is transparent to the laser beam F, to enable the welding at the welding interface 17, and the bottom part can be rigid or flexible, as long as it is absorbent to the laser beam. In practice, as represented more particularly in FIG. 4, the assembly device 10 is intended more particularly for the assembly of an opening, for example of the trunk lid type, of a motor vehicle. In this case, one of the two parts to be assembled is conventionally an appearance part, the clamping end-piece 20 should therefore not be in contact with it, in order to avoid any marking or surface defect due to the contact between the clamping end-piece 20 and the top surface of the part.

In the different configurations represented in FIGS. 1 to 3, the top part 11 will therefore never be an appearance part. As represented more particularly in FIG. 4, the bottom part 12 is therefore the appearance part of the assembly of the two parts 11, 12 and the clamping end-piece 20 according to the invention of the assembly device 10 according to FIGS. 1 to 3 travels along the welding interface 17, bearing on the top surface of the top part 11, which is therefore not the appearance part.

Moreover, as represented more particularly in FIGS. 4, 5a and 5b, the clamping end-piece 20 comprises, for example, four application fingers 23, which are placed in such a way that the clamping end-piece 20 is displaced in the direction of welding defined by the arrow f3 of FIG. 4 with two application fingers 23 at right angles to the direction of displacement of the clamping end-piece 20 (FIG. 4).

As represented in more detail in FIGS. 5a and 5b, each application finger 23 of the clamping end-piece 20 comprises a section 31 that is substantially rounded and an end-piece 32 that is substantially domed or rounded, in order notably to avoid marking the top surface of the top part 11, during the laser welding step of the associated assembly method. Moreover, the application fingers 23 of the clamping end-piece 20 are advantageously linked by at least one solid wall 33, acting as a rigidifying portion of the clamping end-piece 20. As a general rule, the length of the clamping end-piece 20 is as short as possible, for material strength reasons, the length being calculated, preferably, to avoid a breaking of the clamping end-piece 20. Moreover, such a rigidifying wall 33 advantageously makes it possible to lock the calories generated by the reflection of the laser beam F on the application fingers 23 of the clamping end-piece 20 during the welding step of the associated assembly method.

Moreover, the clamping end-piece 20 is advantageously linked to cooling means (not represented in the figures for reasons of clarity), intended to cool the clamping end-piece 20 and more particularly the application fingers 23, when they are used in the laser welding step of the associated assembly method. As an example, the cooling means comprise a pipe, or a duct, inserted into the portion 33 or into another area of the clamping end-piece 20, and linked to a tank of coolant, for example water. The result of this is a continuous flow of the coolant in the pipe, which thus generates a continuous cooling of the application fingers 23 of the clamping end-piece 20, during the associated assembly method.

Similarly, interstices 30 formed between the application fingers 23 of the clamping end-piece 20 allow for a good flow of the air stream A and the end-pieces 32 of the application fingers 23 have a shape that is best optimized to allow the passage of the laser beam F.

Moreover, whatever the embodiment of the assembly device 10 according to the invention (FIGS. 1 to 3), the latter also comprises minimal clamping means 34 (FIG. 2), or geometrical referencing means, intended to immobilize the parts 11, 12 on the support 13, during the welding step. As an example, the support 13 comprises a pillar 35, or reference pilot or piloting standard, on which the parts 11, 12 are mounted, and locking clamps 36, associated with the pillar 35 and intended to keep the assembly of the parts 11, 12 assembled on the support 13. Such minimal clamping means 34 notably make it possible to globally keep the assembly of the two parts 11, 12 assembled on the support 13 and avoid, for example, any lifting or shifting to one side of the two assembled parts 11, 12, during the laser welding opposite this side.

Whatever the embodiment of the assembly device 10 according to FIGS. 1 to 4, the latter therefore offers the main advantage of ensuring a geometrical referencing and a conformation of the two assembled parts that are simple, effective and rapid, while guaranteeing an optimal joining of the parts at the welding interface. Notably, such an onboard clamping system, consisting of the clamping end-piece fixed onto a fixing plate facing the end of the means for projecting the laser beam and bearing on the top surface of the top part, thus makes it possible to eliminate toolage and clamping means, generating savings in terms of complexity and investment.

Moreover, such onboard clamping means offer great flexibility in the use of the assembly device according to the invention, notably because of the joining and of the top clamping means which are managed via a force management system making it possible to manage the force of pressure applied to the parts statically (FIGS. 1 and 2) or dynamically (FIG. 3) and therefore the focal distance d. Thus, just the clamping end-piece fixed to the fixing place can be replaced and changed in the event of a break or to suit the parts or the associated assembly method, so that it offers optimal interchangeability and flexibility for the assembly device according to the invention.

Moreover, such clamping means consisting of a multitude of independent movable members offer true flexibility to the assembly device, which can thus be easily and quickly adapted to other shapes of parts to be assembled.

Similarly, such an assembly device 10 according to the invention, dimensioned to incorporate a function for projecting an air flow rate, thus makes it possible to avoid any carbonization phenomenon on the top surface of the top part, depending on the materials used for the parts 11, 12, which is essential when it comes to weldability and weld quality.

Similarly, the four application fingers 23 of the clamping end-piece 20 according to a particular embodiment make it possible to have a "symmetrical" clamping end-piece, which is displaced simply at the welding interface 17, without superfluous and complex rotation of the head of the associated welding robot.

Furthermore, the use of an air projection means 28 associated with the means 14 for projecting the laser beam F makes it possible to use a top part 11 with a material that is not very transparent, which is not possible with the assembly devices known from the prior art.

A method for assembling two parts 11, 12 made of thermoplastic materials by laser transmission welding by means of an assembly device as described above will now be described with reference to FIGS. 1 to 5b and 7.

The assembly method consists in first positioning the bottom part 12 on the support 13, then the top part 11 on the bottom part 12. In order to ensure correct positioning and securing of the assembly of the two parts 11, 12 on the support 13, a minimal clamping step, or preliminary geometrical referencing step, is carried out. For example, minimal clamping means 34 (FIG. 2) can be used for the assembly of the parts 11, 12, in order to avoid any unwanted movement of the parts 11, 12 positioned on the support 13.

Then, the assembly method according to the invention comprises a step of geometrical referencing of the assembly of the two parts 11, 12 positioned on the support 13 by the first bottom clamping means 15. More particularly, the movable members 16 are all actuated independently of one another according to the geometry of the parts 11, 12 and are placed bearing against the bottom surface of the bottom part 12, all along the welding interface 17 of the two assembled parts 11, 12 (FIG. 7).

Then, the assembly method according to the invention comprises a step of conformation, or bringing into conformity, of the assembly of the two parts 11, 12 positioned on the support 13 by the clamping end-piece 20. More particularly, the clamping end-piece 20 is positioned at the start of the welding interface 17 bearing against the top surface of the top part 11, so as to exert a predetermined force that is necessary and sufficient to the good joining of the two parts 11, 12 at the welding interface 17, notably via the force management system 24.

Then, once this predetermined force is applied, the laser transmission welding step can begin by projection of the laser beam F at the welding interface 17 and displacement of the clamping end-piece 20, according to the arrow f3 (FIGS. 1 and 4), all along the route formed by the welding interface 17. Thus, the clamping end-piece 20, while traveling along the welding interface 17, applies a predetermined force acting as the top clamping function, in order to ensure an optimal joining between the parts 11, 12 that is necessary to the correct performance of the assembly method.

In the embodiment represented in FIGS. 1 and 2, the clamping end-piece 20 applies a constant predetermined force onto the top surface of the top part 11, via the force management system 24. The method then consists in adjusting the tension of the spring 25 at rest, before the start of the associated assembly method, the management system 24 making it possible to keep this predetermined force constant all along the route of the welding interface 17, during the laser welding step of the assembly method.

In the embodiment represented in FIG. 3, the clamping end-piece 20 applies a variable force against the top surface of the top part 11, along the route of the welding interface 17.

The method then consists in applying a predetermined force at the start of the laser welding step and in adjusting this force via the servo-control means 40 of the force management system all along the route of the welding interface 17, notably in order to maintain a constant focal distance d.

Moreover, the assembly method according to the invention advantageously comprises a step of projection of a controlled air stream A, simultaneously with the laser welding step, on the top surface of the top part 11, as represented in FIGS. 2 and 3. Such air input notably makes it possible to avoid any carbonization phenomenon on the surface of the assembled parts and advantageously makes it possible to lightly cool the clamping end-piece 20, at the core of which the laser beam F is projected.

Such a method for assembling, by laser transmission welding, two parts made of thermoplastic materials therefore makes it possible to produce an assembly simply, rapidly and effectively, for parts made of materials that are less expensive and as effective as conventional materials. Moreover, such a laser welding step combined with top clamping means, which are capable of maintaining a predetermined force against the top surface of the top part all along the welding interface, notably make it possible to optimize the method and obtain savings in terms of welding time and in terms of simplicity, flexibility and cost.

The invention is not limited to the various embodiments of the assembly device and of the associated assembly method and clamping end-piece described above. Notably, the assembly device may comprise any type of first bottom clamping means 15, as long as they allow for an optimal geometrical referencing, and may comprise any type of second top clamping means 18, notably of clamping end-piece 20, as long as they allow for an application of a constant or variable predetermined force and a perfect joining of the two parts 11, 12 at the welding interface 17, during the laser welding step of the associated assembly method. Similarly, the number, the shape and the orientation of the elements forming the first clamping means 15 may be different, as long as their orientation is substantially in the direction of projection YY of the laser beam F, at right angles to the welding interface 17.

Similarly, the assembly device 10 may comprise any type of air projection means 28, as long as it allows for a controlled air input on the top surface of the top part 11, and any type of means 14 for projecting a laser beam F. The assembly device 10 according to the invention may also comprise any type of force management system 24, as long as it makes it possible to retain a constant focal distance d between the welding interface 17 and the means 14 for projecting the laser beam F. As a general rule, the assembly device according to the invention may comprise any type of force management system 24, advantageously associated with any type of air input means 28, with any type of means 14 for projecting a laser beam F and with any type of clamping end-piece 20.

The clamping end-piece 20 according to the invention may be of any other form, as long as it allows for an application of force that is optimal and does not damage the top surface of the top part. Notably, as represented very schematically in FIGS. 6a and 6b, the clamping end-piece 20 may comprise a different number of application fingers 23, as long as they allow for the application of the predetermined force that is necessary to the top clamping means 18.

Figure 6A:
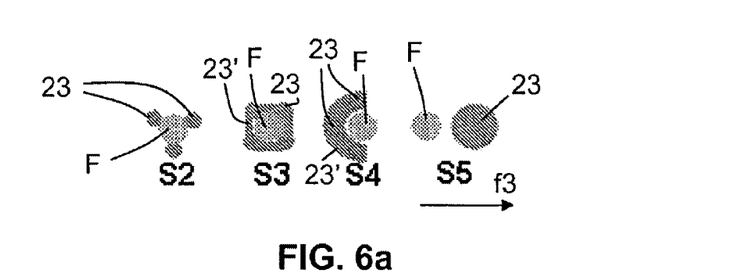
FIGS. 6a and 6b very schematically represent the end of variant embodiments of a clamping end-piece according to the invention associated with the assembly device according to FIGS. 1 to 4.
Figure 6B:
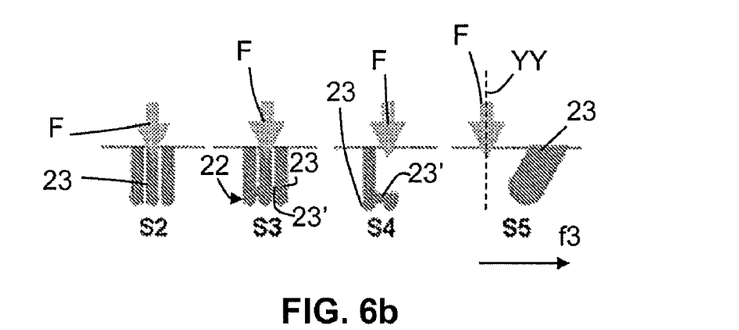

Notably, as represented in FIG. 6a, in which the laser beam F is represented by a light gray solid circle, the clamping end-piece 20 may comprise three application fingers 23, preferably distributed according to the vertices of an equilateral triangle (solution S2); or may comprise four application fingers 23 linked by a cage 23', at the end 22 of the clamping end-piece 20 (solution S3); or may comprise three application fingers 23, distributed in a semicircle and linked by a cage 23', at the end 22 of the clamping end-piece 20 (solution S4); or may comprise just one application finger 23, inclined relative to the axis of projection YY of the laser beam F (solution S5) and bearing in front of the laser beam F, according to the direction of travel f3 (FIG. 6b).

In the case of the solutions S2 and S4, the axis of the robot associated with the means 14 for projecting the laser beam F must then manage an additional degree of freedom to facilitate the trajectory of the robot, namely a rotation, so as to always position at least one application finger 23 in front, according to the direction of travel f3 of the clamping end-piece 20, as represented in FIG. 6b for the solution S5.

The invention claimed is:

1. A device for assembling first and second parts by laser transmission welding, a first transparent top part being positioned on a second absorbing bottom part, an assembly of the first and second parts being positioned on a support for the laser welding, the assembly device comprising:
   a means for projecting a laser beam onto a top surface of the top part; and
   assembly means for keeping the assembly of the first and second parts assembled together on the support;
   the assembly means comprising:
     first clamping means, configured to ensure geometrical referencing of the assembly of the first and second parts positioned on the support;
     second clamping means, configured to exert a predetermined force against the assembly of the first and second parts positioned on the support; and
     a management system, associated with the second clamping means and configured to adjust the force exerted by the second clamping means at a predetermined welding interface of the first and second parts,
     wherein the first clamping means comprises a plurality of movable members, configured to be actuated independently of one another at the welding interface and are movable in X, Y, and Z directions.

2. The assembly device as claimed in claim 1, wherein the second clamping means comprises a clamping end-piece including at least one application finger.

3. The assembly device as claimed in claim 2, wherein the clamping end-piece comprises four substantially parallel application fingers, arranged so as to be positioned substantially at four corners of a square.

4. The assembly device as claimed in claim 2, wherein each application finger comprises a substantially rounded end-piece.

5. The assembly device as claimed in claim 1, further comprising an air input means, configured to project an air stream onto the top surface of the top part simultaneously with the laser beam.

6. The assembly device as claimed in claim 5, wherein the means for projecting the laser beam includes a projection cone, and the air input means is linked to the projection cone, which acts as a cone for channeling the air stream, so as to obtain a controlled air stream on the top surface of the top part.

7. The assembly device as claimed in claim 1, wherein the first clamping means is configured to be actuated manually or automatically.

8. The assembly device as claimed in claim 1, wherein the laser beam is projected on an axis substantially at right angles to the welding interface, and the first clamping means is actuated in a direction parallel to the axis of projection of the laser beam.

9. The assembly device as claimed in claim 1, wherein the second clamping means is linked to a mechanical fixing interface, so as to position the second clamping means facing an end of the means for projecting the laser beam.

10. The assembly device as claimed in claim 1, wherein the second clamping means comprises associated cooling means.

11. The assembly device as claimed in claim 1, wherein the force management system comprises adjustment means, associated with the means for projecting the laser beam, so as to keep the predetermined force constant at the welding interface and maintain a constant focal distance between the welding interface and the means for projecting the laser beam.

12. The assembly device as claimed in claim 1, wherein the force management system comprises servo-control means, associated with the means for projecting the laser beam, so as to adjust the predetermined force continuously at the welding interface and maintain a constant focal distance between the welding interface and the means for projecting the laser beam.

13. A device for assembling first and second parts by laser transmission welding, a first transparent top part being positioned on a second absorbing bottom part, an assembly of the first and second parts being positioned on a support for the laser welding, the assembly device comprising:
 a laser beam that is projected onto a top surface of the top part; and
 an assembly apparatus for keeping the assembly of the first and second parts assembled together on the support;
 the assembly apparatus comprising:
  a plurality of movable members configured to ensure geometrical referencing of the assembly of the first and second parts positioned on the support;
  a clamping end piece configured to exert a predetermined force against the assembly of the first and second parts positioned on the support; and
  a management system, associated with the the clamping end piece and configured to adjust the force exerted by the clamping end piece at a predetermined welding interface of the first and second parts,
  wherein the plurality of movable members are configured to be actuated independently of one another at the welding interface and are movable in X, Y, and Z directions.

14. The assembly device as claimed in claim 13, wherein the clamping end piece includes at least one application finger.

15. The assembly device as claimed in claim 14, wherein the clamping end piece includes four substantially parallel application fingers, arranged so as to be positioned substantially at four corners of a square.

16. The assembly device as claimed in claim 14, wherein each application finger includes a substantially rounded end-piece.

17. The assembly device as claimed in claim 13, wherein the plurality of moveable members are configured to be actuated manually or automatically.

18. The assembly device as claimed in claim 13, wherein the laser beam is projected on an axis substantially at right angles to the welding interface, and the plurality of moveable members are actuated in a direction parallel to the axis of projection of the laser beam.

19. The assembly device as claimed in claim 13, wherein the clamping end piece is linked to a mechanical fixing interface, so as to position the clamping end piece facing an end of the laser beam.

* * * * *